Figure 1:
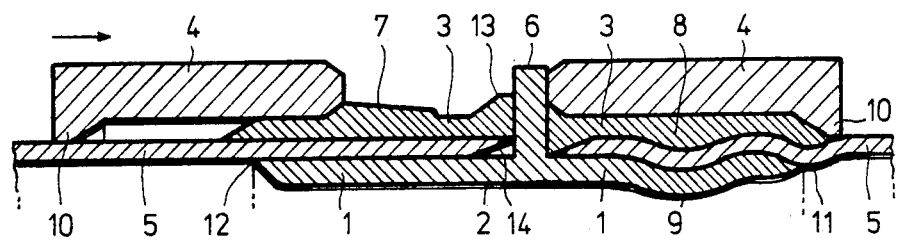

United States Patent

Boss et al.

[11] Patent Number: 4,598,938
[45] Date of Patent: Jul. 8, 1986

[54] COUPLING DEVICE FOR MAKING A PERMANENT PIPE CONNECTION

[76] Inventors: Hans Boss, Zelgmatt 12, CH-8132 Egg/Zch; Jürg Pfister, deceased, late of Ebmatingen; by Lisa Pfister, administrator, Im Grossacker 6, CH-8123 Ebmatingen, all of Switzerland

[21] Appl. No.: 717,229
[22] PCT Filed: Jul. 12, 1984
[86] PCT No.: PCT/CH84/00114
  § 371 Date: Mar. 18, 1985
  § 102(e) Date: Mar. 18, 1985
[87] PCT Pub. No.: WO85/00646
  PCT Pub. Date: Feb. 14, 1985

[30] Foreign Application Priority Data

Jul. 19, 1983 [CH] Switzerland ............ 3947/83
Sep. 19, 1983 [CH] Switzerland ............ 5164/83

[51] Int. Cl.⁴ .............................................. F16L 13/14
[52] U.S. Cl. ............................. 285/382.2; 29/508; 29/520; 285/397
[58] Field of Search ............ 285/382.2, 382.1, 382, 285/397; 29/520, 508

[56] References Cited

U.S. PATENT DOCUMENTS 3,149,860  9/1964  Hallesy .................. 285/382.2 X
3,375,026  3/1968  Szohatzky ............... 285/382.2 X
3,498,648  3/1970  Hallesy .................. 285/382.2 X
3,528,689  9/1970  Roe ....................... 285/382.2
3,893,718  7/1975  Powell ................... 285/382.2 X
4,061,367 12/1977  Moebius ................. 285/382.2

FOREIGN PATENT DOCUMENTS 48003   3/1982  European Pat. Off. .
706420  6/1931  France .................... 285/382.2
2356867 1/1978  France .

Primary Examiner—Thomas F. Callaghan

[57] ABSTRACT

In this pipe connection, the pipe end part (5) is pressed, as a result of cold-forming in zones, by means of a press ring (4) to be displaced axially, to form a positive leak-proof connection with a connection piece (1) inserted into the pipe end part and belonging to a pipe fitting (2). A sleeve (3) to be pushed onto the pipe end part is provided with an annular outer bead (7) and, when the press ring is pressed on, is deformed in such a way that the sleeve material is displaced radially inwards in the bead zone (8), the pipe end part and connection piece acquiring an annular recess (9). Moreover, the press ring (4) has at its rear end an annular inner bead (10) which at the same time displaces the sleeve material radially inwards at the rear sleeve end, as a result of which further pressing takes place at the end (12) of the connection piece (1). The gap between the pipe and connection piece is thus closed, so that no crevice corrosion can occur.

8 Claims, 3 Drawing Figures

COUPLING DEVICE FOR MAKING A PERMANENT PIPE CONNECTION

Coupling devices for making a permanent pipe connection, in which the pipe end part is pressed, as a result of cold-forming in zones, by means of a press ring to be displaced axially, to form a positive leak-proof connection with a connection piece of a pipe fitting, are known in many embodiments, for example from U.S. Pat. Nos. 3,149,860, 3,375,026, 3,498,648, 3,528,689 and 4,061,367.

By means of a coupling device of this type, a pipe connection with good physical properties, such as high mechanical strength and a high degree of leak-proofing, can be made in a simple way and with a relatively low outlay in terms of time and material.

However, it has been shown, in practice, that, in pipe connections of this type, in certain uses the quality of the physical properties mentioned is not maintained in the long term, but on the contrary can diminish to an inadmissible extent within a relatively short operating time as a result of the influences of corrosion and erosion, as a result of which the pipe connection is broken.

If the pipe end part is located within the connection piece, such as, for example, in the pipe connections according to U.S. Pat. Nos. 3,375,026 (FIG. 3) and 4,061,367 (FIG. 5), then, when a liquid medium flows through the pipeline at high speed, turbulence arises on the end face of the pipe end part or at the junction point of two pipe ends as a result of shoulders or gaps. This turbulence leads to erosion effects on the inner wall of the connection piece, that is to say material is removed from the connection piece (and from the pipe end part), until the connection piece finally fractures. Although this defect can be largely eliminated if the coupling parts are constructed in a suitable way and the pipe connection is made accurately, it is nevertheless important, above all, to ensure that the pipe end is cut to size precisely. However, in all uses in which the pipe connection is not made at the factory, for example on building sites, there is no guarantee that the high precision required will be maintained.

Fewer problems arise in this respect in pipe connections with a pipe end part located outside the connection piece, for example according to U.S. Pat. Nos. 3,528,689 (FIG. 3) and 4,061,367 (FIG. 10). In these embodiments, there are no discontinuities in the course of the axial cross-section on the inner wall of the pipe fitting with the connection piece or pieces. In contrast, here, the connection zone at the end of the connection piece is endangered, since crevice corrosion can occur as a result of the capillary penetration of line liquid into the gap between the connection piece and the pipe wall surrounding the latter with a sliding fit, and the pipe is attacked from inside and gradually destroyed. Moreover, a discontinuous change in the throughflow cross-section at the end of the connection piece can also result in turbulence and consequently in erosion in this connection zone.

The invention is intended to provide a coupling device of the type described in the introduction, in which the disadvantages described above can be avoided, in order to obtain a longer service life for the pipe connection.

The gap between the connection piece and the pipe end part and consequently the danger of crevice corrosion can be avoided by means of a press connection of these parts which takes effect at the end of the connection piece. Accordingly, in the invention, the press ring has at its rear end an annular inner bead which, when the press ring is pressed onto the sleeve, displaces the sleeve material radially inwards at the rear sleeve end, and the length of the connection piece in relation to the length of the press ring and consequently to the axial position of the annular recess occurring at the rear sleeve end and located in the pipe end part is selected so that the free end of the connection piece does not project beyond the lowest point of this recess.

In this way, when the pipe connection is made properly, it is guaranteed that a press connection is obtained at the end of the connection piece and that there is therefore no gap between the pipe end part and the connection piece.

The connection piece is preferably designed as a smooth hollow cylinder, in contrast to the connection piece according to FIG. 5 of U.S. Pat. No. 3,528,689, which has an annular groove on its outside to achieve a positive connection with the pipe end part. It is not intended, here, that the connection piece should be deformed when the pipe connection is made. Accordingly, the wall thickness of the connection piece is large, as a result of which a relatively sharp increase in the throughflow speed of the flowing medium and consequently an increased danger of turbulence causing erosion and arising at the inflow edge of the connection piece occur in the region of the pipe connection. In contrast to this, the wall thickness of the smooth connection piece must be kept smaller, so that it becomes possible to deform the pipe end part and the connection piece jointly when the pipe connection is made. At the same time, the danger of erosion is reduced.

A further reduction in the danger of erosion can be achieved if, at the free end of the connection piece, its inner wall is gradually widened at least approximately up to the intersection with its outer wall. It is possible in this way to obtain, within the pipe connection, an axial cross-sectional course having practically no discontinuities which could cause turbulence.

When the connection piece is designed as a smooth hollow cylinder, under some circumstances the tensile stress in the pressed-on press ring can be excessive, and the pressed material of the sleeve, pipe end part and connection piece can be stressed beyond the yield point in places.

To avoid this disadvantage, the connection piece can have on its outside at least one annular groove for receiving material displaced by the press ring.

It becomes possible, in this way, to obtain with a lower pressing force of the press ring a positive and leak-proof connection between the pipe end part and connection piece. At the same time, the pincer pressure required to press on the press ring is reduced. The connection piece is deformed to a lesser extent, so that the desired degree of positive connection is obtained with less deformation work, so as to prevent the pipe end part from being released from the connection piece under a tensile load exerted on the coupling device. Moreover, as a result of less deformation of the connection piece, the throughflow cross-section of the pipe fitting remains practically constant.

Drawn and pressed pipes can have on the inner wall longitudinal scores which originate as a result of production and which do not disappear completely in the coupling zone during cold-forming and can result in leaky connection points. This deficiency can be remedied if the connection piece has on its outside, in the region of an annular groove, at least one peripheral rib with a sharp-edged tip. By means of this measure, any longitudinal scores are interrupted and sealed off during the pressing of the pipes. Appropriately, the peripheral ribs are arranged where the pressing force is greatest.

Exemplary embodiments of the invention are shown in the drawing in partial longitudinal section.

Figure 2:
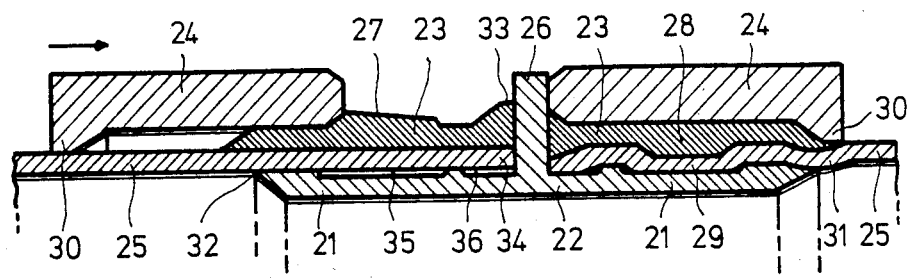

FIGS. 1 and 2 each show a coupling device for connecting two pipes to one another. The left-hand side of each Figure shows parts of the coupling device in the assembled state before the press ring is pressed on, whilst the finished pipe connection is illustrated on the right-hand side of these Figures.

Figure 3:
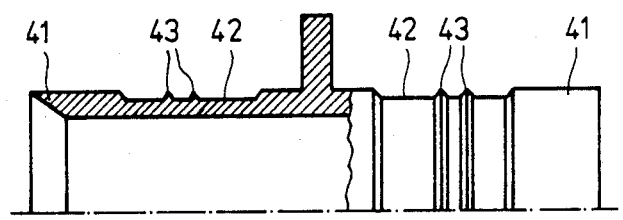

FIG. 3 shows a further embodiment of the pipe fitting.

The coupling device according to FIG. 1 consists, in each pipe connection, of a connection piece 1, of a pipe fitting 2, a sleeve 3 and a press ring 4. The connection piece 1 is designed as a smooth hollow cylinder and is inserted into the straight pipe end part 5. The pipe fitting 2 possesses a flange 6 up against which come the pipe end part 5, the sleeve 3 and the press ring 4. The sleeve 3 to be pushed onto the pipe end part 5 is provided with an annular outer bead 7. When the press ring 4 is pressed on in the direction of the arrow, the sleeve 3 is deformed, so that the sleeve material is displaced radially inwards in the bead zone 8, and the pipe end pipe 5 and connection piece 1 acquire an annular recess 9 at this point and at the same time are pressed into a positive leak-proof connection with one another.

The press ring 4 has at its rear end an annular inner bead 10 which, when the press ring 4 is pressed onto the sleeve 3, displaces the sleeve material radially inwards at the rear sleeve end. At the same time, a further annular recess 11 appears in the pipe end part 5 and in the connection piece 1, and these parts are pressed at the sleeve end. The length of the connection piece 1 in relation to the length of the press ring 4 and consequently the axial position of the recess 11 is selected so that the free end of the connection piece 1 does not project beyond the lowest point of the recess 11. This is to ensure that the degree of pressure exerted on the connection piece 1 at the sleeve end is highest at the end of the connection piece, so that cold-welding takes place. To achieve as continuous a transition of the throughflow cross-section as possible at the end of the connection piece, the connection-piece end 12 should not have any end face, but merely an end edge. For this purpose, the inner wall of the connection piece 1 is gradually widened at least approximately up to the intersection with its outer wall.

It can be appropriate, under certain circumstances, to protect the joint at the flange 6 of the pipe fitting 2 against the penetration of liquid or gaseous media from outside into the connection point between the pipe end part 5 and the pipe fitting 2. Sealing off is again appropriately achieved, in this respect, as a result of pressing caused by means of the press ring 4. For this purpose, the sleeve 3 has at its front end a further annular outer bead 13 which, when the press ring 4 is pressed onto the sleeve 3, is pressed radially inwards onto the edge part 14 of the pipe end part 5.

The pipe is drilled out conically at the edge part 14, to make it easier to insert the connection piece 1 into the pipe end part 5.

The coupling device according to FIG. 2 consists, for each pipe connection, of a connection piece 21 of a pipe fitting 22, a sleeve 23 and a press ring 24. The connection piece 21 is designed in the form of a hollow cylinder and is inserted into the straight pipe end part 25. On the outside of the connection piece 21 there are two annular grooves 35 and 36 for receiving material displaced by the press ring 24. The pipe fitting 22 possesses a flange 26, up against which come the pipe end part 25, the sleeve 23 and the press ring 24. The sleeve 23 to be pushed onto the pipe end part 25 is provided with an annular outer bead 27. When the press ring 24 is pressed on in the direction of the arrow, the sleeve 23 is deformed, so that the sleeve material is displaced radially inwards in the bead zone 28, and the pipe end part 25 acquires an annular recess 29 at this point and at the same time is pressed together with the connection piece 21 to form a positive leak-proof connection.

The press ring 24 has at its rear end an annular inner bead 30 which, when the press ring 24 is pressed onto the sleeve 23, displaces the sleeve material radially inwards at the rear sleeve end. At the same time, a further annular recess 31 appears in the pipe end part 25 and in the connection piece 21, and these parts are pressed at the sleeve end. The length of the connection piece 21 in relation to the length of the press ring 24 and consequently the axial position of the recess 31 is selected so that the free end of the connection piece 21 does not project beyond the lowest point of the recess 31. This is to ensure that the degree of pressure exerted on the connection piece 21 at the sleeve end is highest at the end of the connection piece, so that cold-welding takes place. To achieve as continuous a transition of the throughflow cross-section as possible at the end of the connection piece, the connection-piece end 32 should not have any end face, but merely an end edge. For this purpose, the inner wall of the connection piece 21 is gradually widened at least approximately up to the intersection with its outer wall.

It can be appropriate, under certain circumstances, to protect the joint at the flange 26 of the pipe fitting 22 against the penetration of liquid or gaseous media from outside into the connection point between the pipe end part 25 and the pipe fitting 22. sealing off is again appropriately carried out, in this respect, as a result of pressing caused by means of the press ring 24. For this purpose, the sleeve 23 has at its front end a further annular outer bead 33 which, when the press ring 24 is pressed onto the sleeve 23, is pressed radially inwards onto the edge part 34 of the pipe end part 25, this edge part 34 being displaced into the annular outer groove 36 of the connection piece 21.

FIG. 3 illustrates a further embodiment of a pipe fitting which, in a similar way to the pipe fitting 22 in FIG. 2, has an annular groove 42 on the outside of each connection piece 41. In addition, there are here, in the region of the annular groove 42, two peripheral ribs which have a triangular cross-section and therefore a sharp-edged tip. When the pipes are pressed on, these peripheral ribs 43 penetrate into the inner wall of the latter. As a result, any longitudinal scores on the inner wall of the pipe are interrupted and sealed off.

As is known, special pincers with exchangeable grippers are used to make the pipe connection, and in the example illustrated these are attached either to a press ring and the flange of the pipe fitting or to the two press rings.

The coupling device desribed is suitable for pipe connections of all types, specifically for connecting both metal pipes and plastic pipes.

The pipe fitting preferably consists of the same deformable material as the pipe to be connected to it. The coupling device has possible uses not only in pipeline construction, but also in mechanical tubular structures, for example scaffolding.

The metal pipes can consist, for example, of aluminum, copper and their alloys or of suitable types of steel.

We claim:

1. A coupling device for making a permanent pipe connection, in which the pipe end part (5) is pressed, as a result of cold-forming in zones, by means of a press ring (4) to be displaced axially, to form a positive connection with a connection piece (1) inserted into the pipe end part and belonging to a pipe fitting (2), there being a sleeve (3) which is to be pushed onto the pipe end part and has an annular outer bead (7) and which is deformed when the press ring is pressed on, so that the sleeve material is displaced radially inwards in the bead zone (8), and the pipe fitting having a flange (6), up against which come the pipe end part, the sleeve and the press ring, wherein the press ring (4) has at its rear end an annular inner bead (10) which, when the press ring is pressed onto the sleeve (3), forces the sleeve material radially inwards at the rear sleeve end, and in that the length of the connection piece (1) in relation to the length of the press ring (4) and consequently to the axial position of the annular recess (11) occurring at the rear sleeve end and located in the pipe end part (5) is selected so that the free end (12) of the connection piece does not project beyond the lowest point of this recess.

2. A coupling device as claimed in claim 1, wherein the connection piece (1) is designed as a smooth hollow cylinder.

3. A coupling device as claimed in claim 2, wherein at the free end of the connection piece (1) its inner wall is gradually widened at least approximately up to the intersection with its outer wall.

4. A coupling device as claimed in claim 1, wherein the sleeve (3) has at its front end a further annular outer bead (13) which, when the press ring (4) is pressed onto the sleeve, is pressed radially inwards onto the edge part (14) of the pipe end part (5).

5. A coupling device as claimed in claim 1, wherein the pipe fitting (2) consists of the same deformable material as the pipe to be connected to it.

6. A coupling device as claimed in claim 1, wherein the connection piece (21) has on its outside at least one annular groove (35, 36) for receiving material displaced by the press ring (24).

7. A coupling device as claimed in claim 6, wherein there are two annular grooves (35, 36), each of which is located in the region of an outer bead (27, 33) of the sleeve (23).

8. A coupling device as claimed in claim 6, wherein the connection piece (41) has on its outside, in the region of an annular groove (42), at least one peripheral rib (43) preferentially with a sharp-edged tip.

* * * * *